United States Patent
Yuasa et al.

[11] 3,761,183
[45] Sept. 25, 1973

[54] DEVICE FOR MEASURING COLOR-COMPENSATION QUANTITY FOR COLOR PRINTING

[75] Inventors: Yoshio Yuasa, Sakai; Mikio Naya, Koichiro Tsuchiyasu, both of Toyokawa, all of Japan

[73] Assignee: Minolta Camera Kabushiki Kaisha, Osaka, Japan

[22] Filed: Apr. 19, 1971

[21] Appl. No.: 135,247

[30] Foreign Application Priority Data
Apr. 17, 1970 Japan............................ 45/33252

[52] U.S. Cl.............. 356/175, 355/38, 356/178, 356/222, 356/223, 356/226
[51] Int. Cl. ............................................. G01j 3/50
[58] Field of Search .............. 355/35, 38; 356/175, 356/178, 222, 223, 226

[56] References Cited
UNITED STATES PATENTS
3,527,540 9/1970 Bowker et al...................... 356/175

Primary Examiner—Ronald L. Wibert
Assistant Examiner—F. L. Evans
Attorney—Craig, Antonelli & Hill

[57] ABSTRACT

The appropriate compensation quantities of a color compensation filter for use in color printing, as well as required exposure quantity, can be measured efficiently without insertion of such filters in an actual photographic enlarger. This can be accomplished by employing a device comprising a light source of standard spectrum, a means for measuring light transmitted through a color negative including three photodetectors respectively having photosensitivities in the red, green and blue spectrum ranges, operating circuits for computing each ratio between the output of a selected photoconductor and output of another or the other photodetector, and indicating means for indicating outputs of said operating circuits.

5 Claims, 7 Drawing Figures

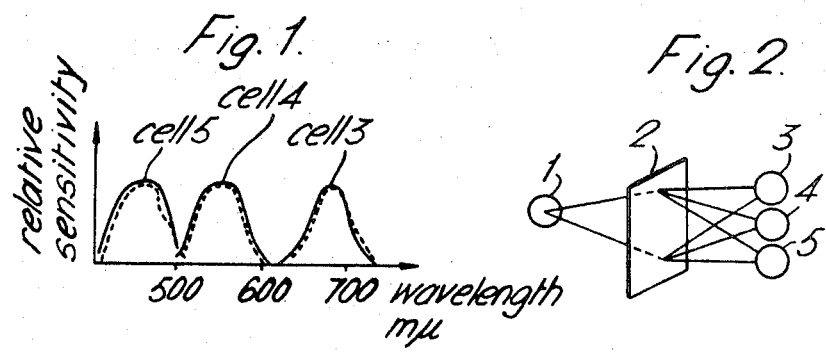
Fig. 1.
Fig. 2.
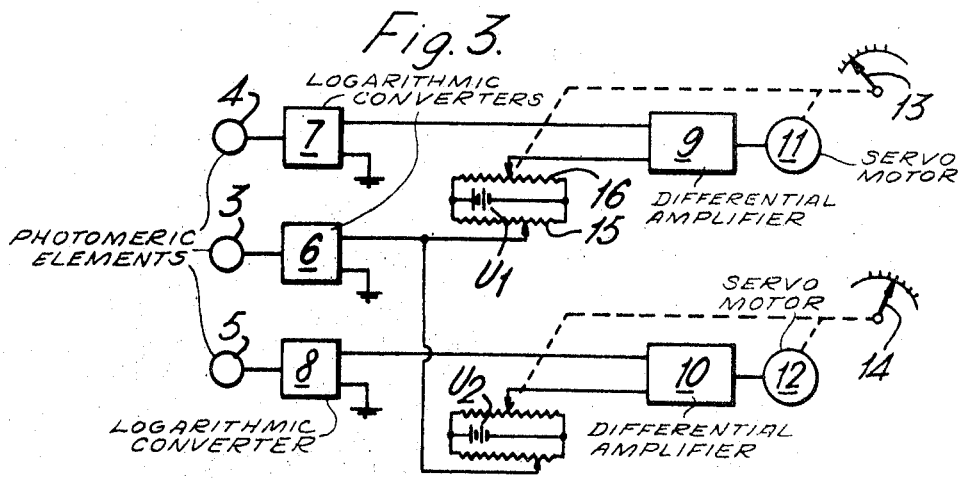
Fig. 3.
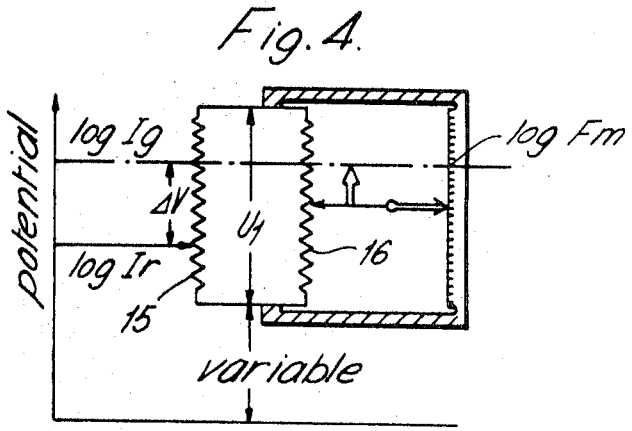
Fig. 4.

DEVICE FOR MEASURING COLOR-COMPENSATION QUANTITY FOR COLOR PRINTING

BACKGROUND OF THE INVENTION

This invention relates to a device for measuring the quantity of color compensation and of exposure in printing a color print from a color negative film in color photography. In the usual case of making a color print, the intensity of transmission of light in the three primary colors (red, green and blue) is measured by employing a color photograph enlarger having color compensation filters, by exchanging various color-compensation filters to be inserted between a light source and the negative film, with respect to each of such color negatives; and such filter is so selected, as to make ratios of photometric values between said three colors equal to experimentally predetermined ratios of the intensities of the three colors, and then an exposure time is determined by measuring the transmission of light with said filter in the inserted state by using a photometric element having a sensitivity over the entire visible wavelength range. In this method, a suitable combination of filters is determined on a trial basis by applying color-compensation filters one by one to the color negative by trial and error method, and thus the exposure time cannot be determined until after a color-compensation filter has been selected. Furthermore, since neither the color-compensation quantity nor the exposure time can be determined without the color-compensation filter being actually applied, an enlarger having a color-compensation filter has to be employed for determining the color-compensation quantity or the exposure time. Consequently, the operation is required to be carried out in a dark room, where a suitable color-compensation filter has to be searched for without the color-compensation quantity being directly readably shown, thus inevitably resulting in an inconvenience in the operation.

SUMMARY OF THE INVENTION

Accordingly, it is an object of the present invention to provide an improved device capable of eliminating such shortcomings in the above-mentioned conventional methods. Namely, this invention dispenses with the necessity of trying various color-compensation filters one by one for determining the color-compensation quantity, and thus enables the determination of the color-compensation quantity to be made without employing an enlarger for color print.

Secondly, it is an object of the present invention to provide a device which provides for the automatic direct reading of the color-compensation quantity.

Further, it is proposed by the present invention that the color-compensation quantity and the exposure quantity can be simultaneously determined.

By achieving these objects, the selection of filters is made possible independently from an enlarger for color print, and the trouble resulting from the trial and error selection of color-compensation filters in determining the color-compensation quantities can be dispensed with. Also, the color-compensation quantities and the exposure quantity can be simultaneously obtained, thereby improving the operation efficiency.

BRIEF DESCRIPTION OF THE DRAWING

The invention will be more fully understood by reference to the following detailed description of the specific embodiment thereof taken in conjunction with the drawing, wherein:

FIG. 1 is a diagram showing the spectrum-characteristic of a photometric device embodying the present invention;

FIG. 2 is a perspective view explaining the constitution of this invention;

FIG. 3 is a schematic block diagram of an example of a device of this invention;

FIG. 4 is a diagram showing electric potential relations in FIG. 3;

DETAILED DESCRIPTION OF THE INVENTION

Figure 5:
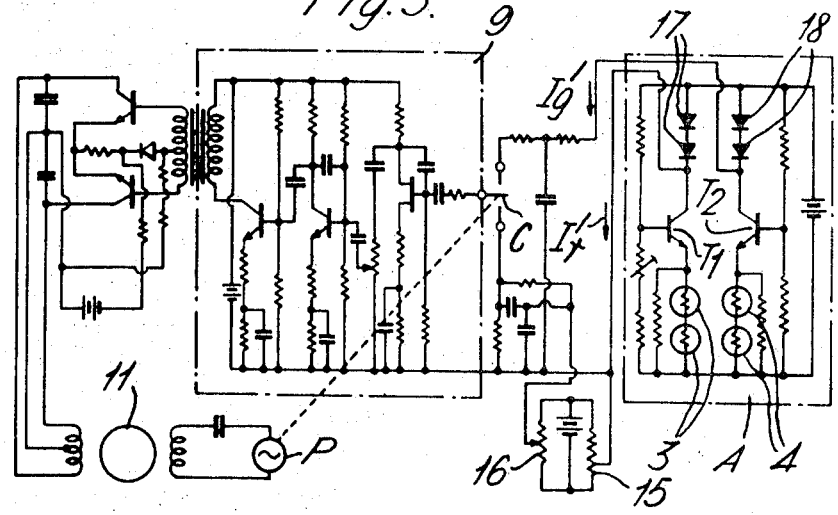
FIGS. 5 and 6 are circuit diagrams of an example of a device of this invention.

The theory of the device of this invention is as follows. The intensity of transmission of light from a specified light source is measured with respect to the three primary colors (red, green and blue) with a selected standard color negative. The measured values are indicated by $Ir$ (red), $Ig$ (green) and $Ib$ (blue). Then a trial printing is made by inserting a filter to reduce the light intensity in the green range (having green-light transmission rate $Fm$) and a filter to reduce the light intensity in the blue range (having blue-light transmission rate $Fy$) between the light source and the color negative. In this way, suitable values of $Fm'$ and $Fy$, as well as a suitable exposure time $t$, are determined. Defining the appropriate exposure quantities for said standard negative as $Er$ for red light, $Eg$ for green light and $Eb$ for blue light, then:

$$Er = Ir\ t$$
$$Eg = Ig\ Fm\ t$$
$$Eb = Ib\ Fy\ t$$

(1)

Defining the appropriate exposure quantities of red, green and blue for an arbitrary negative as $Er'$, $Eg'$ and $Eb'$, then color compensation filters should be selected in a relation that:

$$Er' : Eg' : Eb' = Er : Eg : Eb$$

Since appropriate exposures for the lights of the same color should be equal, $$Er' = Er,\ Eg' = Eg\ \text{and}\ Eb' = Eb.$$

Now designating the transmission rates of the color-balancing filter for said arbitrary color negative as $Fc'$ for red, $Fm'$ for green and $Fy'$ for blue, the intensities of the transmission lights of said three colors through said color negative as $Ir'$, $Ig'$ and $Ib'$, respectively, and the appropriate exposure time as $t'$, then the exposure quantities $Er'$, $Eg'$ and $Eb'$ for the three colors will be given as:

$$Er' = Ir'\ Fc'\ t' = Er$$
$$Eg' = Ig'\ Fm'\ t' = Eg$$
$$Eb' = Ib'\ Fy'\ t' = Eb$$

(2)

It is experimentally found that in most cases, a color compensation can be made by $Fc' = 1$ (without the filter to reduce red light), and therefore, the case of $Fc'$ = 1 will be initially explained hereunder. From the equation (2), the following is obtainable:

$$Eg'/Er' = Ig' \cdot Fm/Ir, \quad Eb'/Er' = Ib' \cdot Fy'/Ir' \quad (3)$$

By applying the equation (1), the preceding equation (3) will become, respectively, $$Ig' \cdot Fm'/Ir' = Ig \cdot Fm/Ir, \quad Ib' \cdot Fy'/Ir' = Ib \cdot Fy/Ir \quad (4),$$

wherein, $Fm$ and $Fy$ have been determined by the trial printing by the standard color negative arbitrarily chosen first, and therefore, by measuring $Ir$, $Ig$, $Ib$, $Ir'$, $Ig'$ and $Ib'$, the transmission rates of the desired color-compensation filters can be determined from the equation (4). Since $Ir$, $Ig$, $Ib$, $Ir'$, $Ig'$ and $Ib'$ are the intensities of the trasmission lights through bare color negatives without employing a filter, it is not necessary to trially apply a color-compensation filter for choosing it. $..r, ...$ and $Ir', ...$ are measured with photometric elements for red, green and blue having spectrum-sensitivities which are the same as those of a printing paper, as shown in FIG. 1. In FIG. 1, solid curves indicate the former sensitivities, while the dotted curves indicate the latter sensitivities.

In FIG. 2, numeral 1 designates a light source, 2 designates a color negative film, 3 designates the above-mentioned photometric element for red, 4 designates the element for green, and 5 designates the element for blue, respectively. If $Ir$, $Ir'$, etc. are measured, the color-compensation filter will be determined as follows. As for the exposure time $t'$, by applying the respective first equations of the equations (1) and (2), then:

$$Ir' \cdot Fc' \cdot t' = Ir \cdot t, \text{ and accordingly } t' = Ir/Ir' \cdot Fc' \cdot t \quad (5),$$

wherein, usually $Fc' = 1$, and therefore:

$$t' = Ir/Ir' \cdot t \quad (6),$$

in which, $Ir$ and $Ir'$ can be measured, and $t$ has been determined by the trial printing. Accordingly, the exposure time $t'$ will be obtained by the equation (6).

FIG. 3 is a schematic block diagram showing the configuration of the device of this invention, which automatically performs the above-mentioned calculations. The above-mentioned theory contains many proportional calculations, such as $Ig/Ir$, etc. To work these calculations out in an analog way, it is convenient to convert them into the logarithms thereof and take differences therebetween. Direct proportional calculations may, of course, be adopted. Numerals 3, 4 and 5 in FIG. 3 indicate the photometric elements shown in FIGS. 1 and 2, namely, element 3 for red light, element 4 for green light and element 5 for blue light. Numerals 6, 7 and 8 designate respectively the logarithm-converters for the outputs of the photometric elements 3, 4 and 5. Elements 9 and 10 are differential amplifiers, elements 11 and 12 are servomotors, and elements 13 and 14 are pointers for designating correction quantities of green reducing and blue reducing filters, respectively.

With regard to color-compensation filters, an explanation will be made in the following concerning the determination of the filter $Fm'$ for reducing green light. The manner of determining the filter $Fy'$ for reducing blue light is exactly the same.

Photometric values $Ir$ and $Ig$ of red and green lights of a standard color negative are converted into logarithms by the converters 6 and 7, and the converted value, $\log Ig$, as it is, is fed to one input terminal of the differential amplifier 9. On the other hand, the other converted value, the $\log Ir$, is fed to the other input terminal of the amplifier 9 through variable resistors 15 and 16. The amplifier 9 amplifies the difference between these two inputs to drive the servomotor 11, and moves the variable resistor 16 so as to reduce the output of the amplifier 9 to zero, namely, to make the difference between the inputs zero. The pointer 13 of the indicating means for green light reducing filter $Fm$ and the variable resistor 16 are interlocked to each other. A voltage is imparted to both ends of the variable resistors 15 and 16 by a battery U, but this battery is not grounded. Therefore, the electric potential relations of the inputs into the amplifier 9 become as shown in FIG. 4. By assuming the difference between $\log Ig$ and $\log Ir$ to be $\Delta V$, a servo-mechanism moves a sliding terminal of the variable resistor 16 in such a manner as to make the difference between the potential of said sliding terminal and $\log Ig$ zero, making the potential difference between each sliding terminal of the variable resistors 15 and 16 also $\Delta V$. In FIG. 4, the overall level of $U_1$ can be arbitrarily set by the sliding terminal of the variable resistor 15. It is constituted that the logarithm of the transmission rate $Fm$ of the green light reducing filter is to be indicated by the position of the sliding terminal on the variable resistance 16. Said sliding terminal of the variable resistor 15 is so adjusted that the pointer 13 indicates the $\log Fm$ on a graduation for the standard color negative. The value of $Fm$ has been determined by a trial printing of a standard color negative as mentioned before. What is termed $\Delta V$ here represents $\Delta V = \log Ig - \log Ir$ which equals $\log Ig/Ir$.

Next, when an arbitrarily color negative is brought, in the same manner as above, the pointer 13 indicates $\Delta V' = \log Ig'/Ir'$.

According to the equation (4), $Fm' = Fm \cdot Ig/Ir \cdot Ir'/Ig'$. If both sides are converted into a logarithm:

$$\log Fm' = \log Fm + \Delta V - \Delta V' \quad (7).$$

If the variable resistor 15 has previously been adjusted to make the pointer 13 indicate $\log Fm$ when $\Delta V'$ is $\Delta V$, and if the pointer shifts by $\Delta V - \Delta V'$ when an arbitrary color negative is applied, then the above-mentioned equation (7) indicates the addition of $$\log (Ig/Ir) - \log (Ig'/Ir') = \log (Ig/Ir) \cdot (Ir'/Ig')$$

to $\log Fm$, and therefore, the pointer 13 indicates $\log Fm'$.

In determining $Fy'$, exactly the same thing as the foregoing takes place.

The transmission rate of the filter should be smaller than 1, but when perfunctorily operating according to the equation (7), it sometimes results that $Fm' > 1$. This is due to an attempt, as explained at the outset, to compensate the color by means of filters for reducing the other two color lights without employing the red light reducing filters. Therefore, when $Fm'$, etc., become larger than 1, the red light reducing filter must also be employed.

Designating in this case the transmission rates of sought filters as $Fm''$, $Fy''$ and $Fc'$, respectively, and perfunctorily given rates as $Fm'$ and $Fy'$, the equation (2) turns out to be $Fm'' = Fc' \cdot Fm'$, $Fy'' = Fc' \cdot Fy'$. To realize this with the device of FIG. 3, the operation of adding log $Fc'$ to both sides of the equation (7) may be made. With respect to said device, this can be done by shifting the output of the logarithm converter 6 to the output of the photometric element 3 to the extent of log $Fc'$, or by lowering the sensitivity of the photometric element 3 to a value multiplied by $Fc'$. This lowering can be realized by regulating a variable resistor located at suitable places in the circuit. $Fc'$ need not be selected in a wide range, but two or three kinds are sufficient, and calibrations for two or three kinds of $Fc'$ may be marked on a knob of said variable resistors.

An indication of exposure time can be achieved by utilizing the output of the photometric element 3 shown in FIG. 3, as it is, or otherwise, by employing a separate photometric element which is sensitive only to red light. If logarithms of both sides of the equation 6 are applied, then log $t'$ = log $Ir$ + log $t$ − log $Ir'$. In a meter to indicate log $t'$, if a calibration is shifted to make the pointer show log $t$ for a standard negative, log $t'$ can be indicated for an arbitrary negative.

Figure 6:
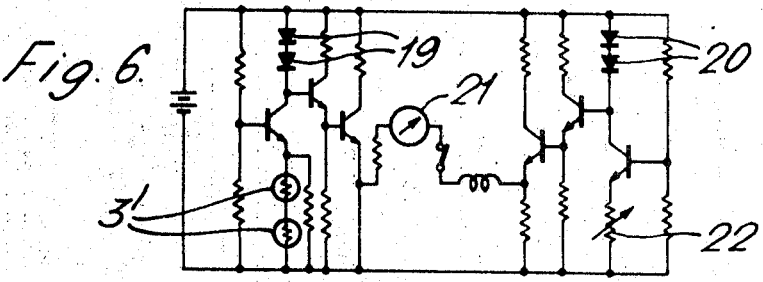

FIGS. 5 and 6 are circuit diagrams of exemplary devices of this invention. FIG. 5 represents a color-compensation indicating circuit, showing therein only the circuit for determining $Fm'$. Numerals 17 and 18 indicate logarithmic converting elements. The practical device may employ for each of the photometric elements 3 and 4, a series-connection of more than two photometric cells, such as cadmium sulfide cells, in order to obtain an output corresponding to the harmonic mean of the light on various parts. Resistance changes of the photometric elements 3 and 4 are converted into current changes by transistors $T_1$ and $T_2$, and the current changes are logarithmically converted by logarithmic converting elements 17 and 18 into voltages.

Figure 7:
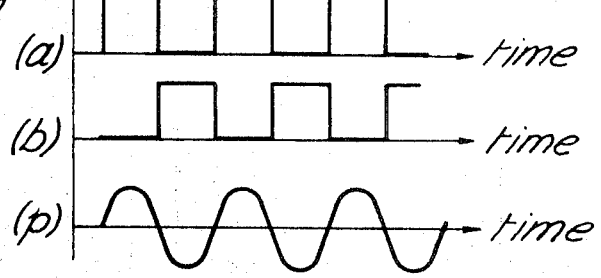
FIG. 7 is an output waveform diagram of the principal parts of the preceding diagrams.

Section A enclosed by the chain lines corresponds to the parts indicated by numerals 3, 4 and 6, 7 in FIG. 3. Character C designates a chipper which is switched over in synchronism with alternating current source P. In this way, log $Ir'$ through the variable resistors 15 and 16, and log $Ig'$ are alternately imparted to the amplifier 9. Since a ground line of the amplifier 9 is made to be of the same electric potential as log $Ir'$ its output is inherently log $Ig'/Ir'$. The output waveform of the amplifier 9 shifts by a half period as shown by curves (a) and (b) of FIG. 7, depending on the electrical potential of the sliding terminal of the variable resistor 16, depending on whether it is higher or lower than log $Ig'$. Consequently, the servomotor 11, which is driven by an a.c. power source having a waveform shown by curve (p) of FIG. 7 synchronized with the chopper C, alternates its rotating direction depending on the electric potential of the sliding teminal of the variable resistance 16, depending on whether it is higher or lower than log $Ig'$, and stops when both factors are equal. A part of a base-bias resistance of the transistor $T_1$ is made into a variable resistance, by whose adjustment, the current conversion rate of the resistance change of the photometric element 3 is altered to effect the afore-mentioned correction of $Fc'$.

FIG. 6 indicates an exposure-time indicator which indicates exposure time in voltage values converting the resistance changes into a logarithm by means of a logarithmic converting element 19 in the same manner as in the case of FIG. 5, by using an element 3' which is photosensitive to red light, apart from the photosensitive element 3 in FIG. 5. In the right-hand side of FIG. 6, at the counterpart to the photometric element 3' in the left-hand side is connected a variable resistor 22, whose resistances are converted into logarithms by a logarithmic converting element 20 and is indicated as a voltage, difference between both the voltages of variable resistor 22 and the photometric element being indicated by a meter 21. The variable resistance 22 is adjusted so that the meter 21 points to zero when a standard negative is used. Then the exposure time is set by turning the dial so that its zero calibration comes under the pointer. The time graduation is arranged in logarithmic graduation.

The foregoing is a description of an embodiment of this invention, which ensures very efficient and simplified operations because thereby, as afore-mentioned, the transmission rate of a desired filter can be automatically determined and is directly readable without employing an enlarger and without actually sliding in and out various color-compensation filters for trial purposes, enabling the operation to be carried out in a light place, and simultaneously, the exposure time can be measured.

While we have shown and described various embodiments in accordance with the present invention, it is understood that the same is not limited thereto, but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A device for measuring the color compensation quantity for color printing comprising:
   a light source for projecting on a color negative a light of standard spectrum;
   three photo detectors for measuring the light transmitted from said light source through the color negative, respectively having photo-sensitivities in red, green and blue spectrum ranges, which ranges are defined to suit respective spectrum sensitivity characteristics of respective layers in an emulsion of a color printing paper;
   a first operating circuit responsive to the output of the red and green photodetectors for computing the ratio between the output of the red photo detector and the output of the green photo detector;
   a second operating circuit responsive to the output of the red and blue photodetectors for computing the ratio between the output of the red photo detector and the output of the blue photo detector;
   a pair of indicating means for indicating color compensation quantities in green and blue spectrum ranges, respectively, in response to the outputs of said first and second operating circuits; and an exposure time indicator operatively coupled to a photo detector sensitive in the red spectrum range to the light from said light source.

2. A device as defined in claim 1, wherein each of said operating circuits comprises:

logarithm-converting circuits respectively connected to the red photo detector and a respective one of said blue and green photo detectors;

a differential amplifier, one input terminal of which is connected to the logarithm-converting circuit that is connected to receive the output of the red photo detector, and the other input terminal of which is connected to receive the output of said respective one of said photo detectors; and a voltage generator which is connected between one of said logarithm-converting circuits and said one input terminal of the differential amplifier and comprises a manually operable member for changing the voltage of the voltage generator; and wherein each of said indicating means comprises:

a servo system which, in response to the output of said differential amplifier, adjusts the output of said voltage generator in a manner so that the sum of the output of the voltage generator and the output of one of said logarithm-converting circuits is equalized with the output of the other of said logarithm-converting circuits; and an indicating member which indicates the color compensation quantity in response to the adjustment of the voltage generator.

3. A device as defined in claim 2, wherein each voltage generator comprises an electric power source, a first potentiometer having both ends thereof connected across the power source and being connected to the red logarithm-converting circuit with a movable contact thereof, and a second potentiometer having both its ends connected across the power source and having a movable contact connected to the corresponding differential amplifier.

4. A device as claimed in claim 3, wherein said movable contact of said second potentiometer is interlocked with said servo system and said first potentiometer is so constructed as to be manually adjustable.

5. A device as claimed in claim 4, wherein each logarithm-converting circuit, for each of the red, green and blue spectrum ranges, comprises a logarithm-converting diode member connected to the collector of a transistor, and wherein one of said photo detectors consists of at least two-series-connected photo conductive cells connected to the emitter of said transistor.

* * * * *